Dec. 8, 1959 S. PAULL 2,916,729
MAGNETIC CORE BINARY CIRCUIT
Filed Aug. 29, 1957
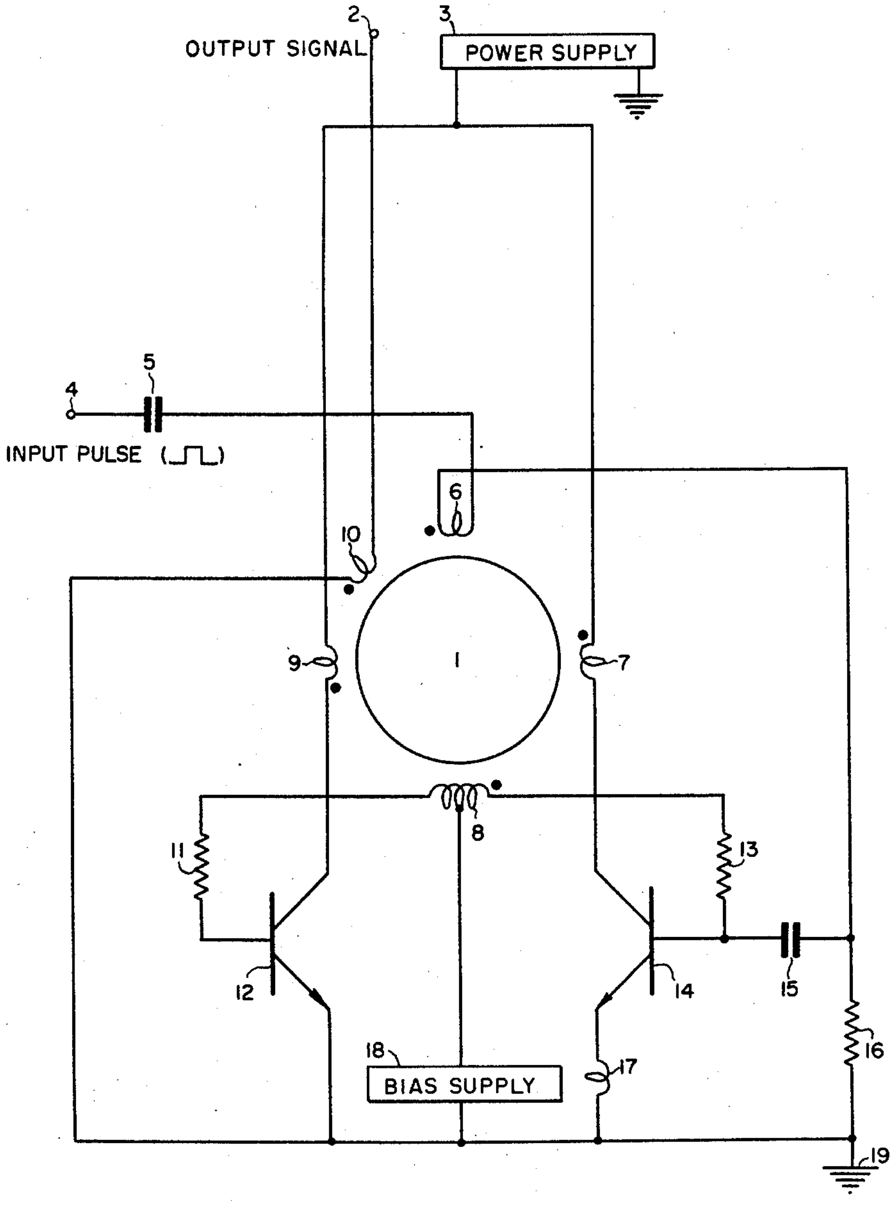
INVENTOR
STEPHEN PAULL
BY W. R. Matthews
Richard E. Reed
ATTORNEYS 2,916,729

MAGNETIC CORE BINARY CIRCUIT

Stephen Paull, Falls Church, Va.

Application August 29, 1957, Serial No. 681,145
8 Claims. (Cl. 340—174)
(Granted under Title 35, U.S. Code (1952), sec. 266)

The invention described herein may be manufactured and used by or for the Government of the United States of America for governmental purposes without the payment of royalties thereon or therefor.

This invention relates to electronic circuits and more particularly to binary circuits.

Reduction of power consumption in a binary circuit has long been a goal to be obtained. One previous method of solution was to provide the power for changing the condition of the binary element in the input pulses themselves. The magnitude required of the input pulses was undesirably large. Other prior art systems used a separate "clock" or carrier frequency signal to furnish power. Such a "clock" system required that the input pulses be synchronized with the "clock" pulses and that operation of the counter be limited by the characteristics peculiar to the "clock" pulses. Still other prior art systems employing magnetic components failed to provide for automatic determination of whether to apply positive or negative remanence changing force even though the systems included many components.

It is, therefore, an object of this invention to provide a binary circuit having low power consumption.

Further, an object of this invention is to provide a binary circuit in which power is drawn from the supply only during the changing of the state of the binary element.

Another object of this invention is to provide a binary circuit which will operate upon the receipt of an input pulse of small amplitude.

Still another object of this invention is to provide a binary counter which does not require a "clock" nor a carrier frequency input power signal.

Also, an object of this invention is to provide a binary circuit employing a magnetic storage element wherein the circuit itself determines automatically whether to apply a positive or a negative state changing force to the magnetic storage element.

A further object of this invention is to provide a binary counter circuit having a small number of components.

The exact nature of this invention as well as other objects and advantages thereof will be readily apparent from consideration of the following specification relating to the annexed drawing in which the single figure is a schematic diagram of a typical embodiment of the binary circuit of the present invention.

The circuit of this invention is a binary counter with a high remanence magnetic core as the binary means and transistors in the control circuit therefor. Trigger pulses are applied selectively to one of the two transistors which are used as switches to control the flow of current from a power source through windings placed on the core to change the flux alignment of the core. A first input pulse drives the base of one transistor to the "on" condition and the base of the other transistor to the "off" condition. Current flow through the first transistor as a result of this first pulse induces a change of state of the core. The next input pulse drives the core to saturation and then develops a positive potential which is applied to the base of the second transistor, turning it "on." The current of the second transistor flows through a second winding which again changes the state of the magnetic core.

The core can be composed of tape wound material or of ferrites, or the like, which is of high remanent value. The core is capable of being stabilized in either of two states of flux alignment, called remanence. The state of stability which results from positive flux alignment is conventionally called "one," and the state of stability which results from negative flux alignment is conventionally called "zero." In a magnetic core, total flux alignment is called saturation. The magnetic core is incapable of retaining a state of flux saturation when the magnetizing force is removed, however, the flux alignment will return to the state of remanence that has the same sense as the sense of the previous state of saturation which existed in the core. In the drawing, each core winding is shown with a dot at one end thereof. By convention, a positive potential applied to the not-dotted end of any winding on the core produces a positive flux alignment in the core.

Disposed on core 1 are single windings 6, 7, 9 and 10 and a center tapped winding 8. The not-dotted end of winding 6, which may be termed an input winding, is coupled to input terminal 4 with a coupling circuit which includes capacitance 5 and resistance 16. The dotted end of winding 6 is coupled to the base element of transistor 14 by means of a coupling circuit including capacitance 15, resistance 13 and a portion of winding 8. Resistance 13, in addition to being an element of the aforementioned coupling circuit, also serves as a current limiting device for transistor 14. The collector element of transistor 14 is connected to a suitable source of positive potential such as the power supply 3, which typically may be a plurality of batteries, through winding 7, the polarization being such that the not dotted end of winding 7 is connected to the collector of transistor 14. The emitter element of transistor 14 is connected to ground 19 via choke 17. Choke 17 is selected so that its impedance values will slow the fall from saturation to remanence of the same state so that the voltages induced across the windings will not be sufficient to cut "on" either of the transistors, thereby precluding free oscillation of the circuit.

The remainder of winding 8 is connected to the base of transistor 12 with current limiting resistance 11 connected therebetween. The collector of transistor 12 is connected to the dotted end of winding 9. The not-dotted end of winding 9 is connected to the power supply 3. The circuit from the power supply 3 through winding 9 and transistor 12 is completed by the connection of the emitter of transistor 12 to the common return 19. Winding 9 can be called a core state changing winding and winding 7 can be called a core state reset winding. Core 8 can be termed a control winding. Winding 10 is an output winding so polarized that a positive output pulse can be tapped at terminal 2 and common return 19 during positive flux alignment in the core.

The operation of the circuit can be better described by assuming that core 1 is in condition "zero," negative remanence. A first positive input pulse induces a positive voltage at the not-dotted end of each of core windings 6, 7, 8, 9 and 10. The positive voltage from the not-dotted end of winding 8 is applied through resistor 11 to the base of transistor 12, and the negative potential, which exceeds the positive pulse across capacitor 15 during the rise time of the input pulse, is applied through resistor 13 to the base of transistor 14. Transistor 12 is caused to be turned "on" and transistor 14 is caused to be further cut "off." The transistors are maintained in this condition by voltages induced across winding 8 by the current flow through switching winding 9 as long as flux alignment is changing in the core. During such time, a positive output pulse is induced in winding 10 and is available across output terminal 2 and the common return. When the core reaches positive saturation, transistor 12 is again cut off and the core returns to positive remanence.

The next positive input pulse again induces a positive voltage which is applied to the base of transistor 12 and a negative voltage which is applied to the base of transistor 14. The flux alignment in the core changes from positive remanence to positive saturation, producing a positive output pulse at terminal 2 of far less magnitude than the first positive output pulse. The voltages which are applied to the bases of transistors 12 and 14 vanish as soon as the core reaches positive saturation with no further flux change. The input trigger pulse, however, still flows through resistor 16 after the core reaches saturation, and the resulting positive pulse that is developed is coupled through capacitor 15 to the base of transistor 14 and is no longer cancelled by any induced voltage on winding 8. Transistor 14 turns "on" and the core returns to negative remanence, the original condition of the core before the application of the two discussed positive input pulses. During such return to negative remanence, a negative output is available across output terminal 2 and the common return.

The circuit is now at rest and is in condition for operation upon the receipt of the next positive input pulse.

For every two positive input pulses, two positive output pulses and one negative output pulse induced across winding 10 can be taken across terminal 2 and common return 19. The two positive output pulses are of such different magnitudes that the smaller of the two can be made ineffective and only the larger utilized so that a count down frequency division by a factor of two is obtained. The negative output pulses appear at half the frequency of the input pulses and also represents frequency division by a factor of two.

The values of the components of a typical circuit of this invention are given. The core material is made up of 79% nickel, 4% molybdenum with the balance being iron. The thickness of the tape is 1 mil and the width of the tape is 1/8 of an inch. The outside diameter of the core is 3/4 of an inch while the inside diameter of the core is 1/2 of an inch. The power supply is twenty two and a half volts. Winding 6 has 50 turns while windings 7 and 9 have 200 turns. Winding 8 has 400 turns and winding 10 has the number of turns, 50, for example, to provide the arbitrarily desired output voltage. The p-n-p transistors are No. 2–N–27. Capacitance 5 has the capacitance of .01 microfarad. Capacitance 15 has a capacitance which is determined by the desired speed of operation of the circuit, typically, .01 microfarad. Resistors 11 and 13 are 100 ohms each. Resistor 16 is 10,000 ohms. The magnitude of the input pulse is determined by the requirements of triggering the circuit, typically .3 volt.

In conclusion, I have produced a binary counter circuit with low power consumption. Further, the power supply is used only during the changing of the state of the binary element, and the circuit will operate upon the receipt of an input pulse of small amplitude. There is no "clock" nor carrier frequency input power signal to overload the circuit and there is no dependence on the limitations which are inherent in such power signals. With a very small number of components, the circuit of this invention automatically determines whether to apply a positive or a negative state changing force to the magnetic storage element.

Obviously many modifications and variations of the present invention are possible in the light of the above teachings. It is therefore to be understood that within the scope of the appended claims the invention may be practiced otherwise than as specifically described.

What is claimed is:

1. In a binary counter circuit, binary means capable of being stabilized in either of two states, means for applying unilateral input signals to said binary means, means for changing the state of said binary means, means for resetting the state of said binary means, power supply means connected to said means for changing the state and said means for resetting the state of said binary means, a common return, first switch means, said first switch means being connected between said means for changing the state of said binary means and said common return, second switch means, inductance means, said second switch means being connected between said means for resetting the state of said binary means and said inductance means, said inductance means being connected to said common return, means for controlling the operativeness of said means for changing the state of said binary means and said means for resetting the state of said binary means, said means for controlling being connected to said first and second switch means.

2. In a binary counter circuit, binary means capable of being stabilized in either of two states, means for applying input signals to said binary means, means for changing the state of said binary means including first inductance means and first switch means, a power source, said first inductance means coupled to said binary means and connected between said power source and said first switch means, a common return, said first switch means connected to said common return, means for resetting the state of said binary means including second inductance means, second switch means and third inductance means, said second inductance means being coupled to said binary means and connected between said power source and said second switch means, said third inductance means connected between said second switch means and said common return, means for controlling the operation of said means for changing and said means for resetting the state of said binary means including fourth inductance means, said fourth inductance means being inductively coupled to said binary means and connected between said first switch means and said second switch means.

3. In a binary counter circuit, a binary means capable of being stabilized in either of two states, a first capacitor, means for applying an input signal to said binary means, means for connecting said first capacitor to said means for applying an input signal, a first impedance element, a common return, means for connecting said first impedance element between said means for applying said input signal and said common return, a power source, binary stability changing means inductively coupled to said binary means, a first switch, means for connecting said binary stability changing means between said power supply and said switch, means connecting said switch to said common return, binary stability resetting means inductively coupled to said binary means, a second switch, means for connecting said binary stability resetting means between said power source and said second switch, an inductance means, means connecting said inductance means between said switch and said common return, means for controlling the operation of said first and second switches including a control element inductively coupled to said binary means, a second impedance element, means for connecting said second impedance element between said control element and said first switch, a third impedance element, means connecting said third impedance element between said control element and said second switch, a second capacitor, means for connecting said second capacitor between said means for applying an input signal and said second switch.

4. In a binary counter circuit, a magnetic core, an input terminal, a first capacitor, an input winding inductively coupled to said core, means for connecting said first capacitor between said input terminal and said input winding, a first impedance element, a common return, means for connecting said first impedance element between said input winding and said common return, a power supply terminal, flux switching winding inductively coupled to said core, a first transistor including at least a collector, a base and an emitter, means for connecting said flux switching winding between said power supply terminal and the collector of said first transistor, means connecting the emitter of said first transistor to said common return, a flux resetting winding, a second transistor including at least a collector, a base and an emitter, means for connecting said flux resetting winding between said power supply terminal and the collector of said second transistor, an inductance means, means connecting said inductance means between the emitter of said second transistor and said common return, a control winding inductively coupled to said core, a second impedance element, means for connecting said second impedance element between said control winding and the base of said first transistor, a third impedance element, means connecting said third impedance element between said control winding and the base of said second transistor, a second capacitor, means for connecting said second capacitor between said input winding and the base of said second transistor, an output winding inductively coupled to said core, means for connecting said output winding to said common return, an output terminal, and means for connecting said output winding to said output terminal.

5. In a binary counter circuit, a high remanence magnetic core capable of being stabilized in either of two states, first means for changing the state of said core into one of the stable states, second means for changing the state of said core into the other of said stable states, said first means being operative during both of said stable states and said second means being operative during only one of said stable states where said first means controls the operativeness of said second means.

6. In a binary counter circuit, a high remanence magnetic core capable of flux saturation and remanence, each in two opposed polarities, first means for aligning the flux in said core in the first of said polarities, second means for aligning the flux in said core in the second of said polarities, said first means being operative to change the flux alignment from saturation in said second polarity to saturation in said first polarity and to change the flux alignment in said core from remanence to saturation in said first polarity, said second means being operative only to change the flux alignment in said core from saturation of said first polarity to saturation of said second polarity where said first means controls the operativeness of said second means.

7. In a binary counter circuit, a high remanence magnetic core capable of being stabilized in either of two states, a power source, a common return, first means for changing the state of said core into one of the stable states connected between said power source and said common return, second means for changing the state of said core into the other of said stable states connected between said power source and said common return, third means for applying input signals to said magnetic core, said first means being operative in response to all input signals and said second means being operative in response to alternate input signals.

8. In a binary counter circuit, a high remanence magnetic core capable of flux saturation and remanence, each in two opposed polarities, a power source, a common return, first means for aligning the flux in said core in the first of said polarities connected between said power source and said common return, second means for aligning the flux in said core in the second of said polarities connected between said power source and said common return, third means for applying input signals to said magnetic core, said first means being operative to change the flux alignment in said core from saturation in said second polarity to saturation in said first polarity upon the receipt of a first input pulse, said first means being operative to change the flux alignment in said core from remanence in said first polarity to saturation in said first polarity upon the receipt of a second input pulse, said second means being operative to change to flux alignment in said core from saturation in said first polarity to saturation in said second polarity upon the completion of the operation of said first means upon the receipt of said second input pulse.

References Cited in the file of this patent

UNITED STATES PATENTS

| | | |
|---|---|---|
| 2,611,085 | Masson | Sept. 16, 1952 |
| 2,819,394 | Gordon | Jan. 7, 1958 |